Patented Nov. 21, 1933

1,936,250

UNITED STATES PATENT OFFICE 1,936,250

PROCESS FOR THE PREPARATION OF DISPERSIONS

Hyman Limburg, Amsterdam, Netherlands, assignor, by mesne assignments, to The Flintkote Corporation, Boston, Mass., a corporation of Massachusetts No Drawing. Application February 20, 1929
Serial No. 341,570

4 Claims. (Cl. 260—158)

The invention concerns a method for the preparation of aqueous dispersions of substances not or hardly soluble in water. The invention particularly concerns a method for the stabilization of dispersions of the said type.

It is known to use so-called sulphite liquor in the preparation of emulsions of substances like asphalt, tar, rubber, paraffin, oil, etc. According to the known methods, the material to be emulsified is mixed with an aqueous solution containing sulphite liquor while stirring more or less vigorously. I have found that sulphite liquor cannot be considered as a good emulsifying agent, that is to say, it does not function to subdivide the material to be emulsified into minute particles, as efficiently as is required in commercial practice. As a result of these facts, the use of a powerful stirring or disintegrating apparatus is necessary in the preparation of emulsions with sulphite liquor. But even then the emulsion product has, as a rule, a more or less coarse character, resulting in a corresponding tendency of the particles of the dispersed product to settle rapidly under the influence of gravity, when the emulsion is stored in a quiescent state.

On the other hand, the sulphite liquor or certain substances contained therein, have a favorable stabilizing action on the dispersed particles of an emulsion, so that emulsions made with sulphite liquor as a rule possess a high stability against various coagulating influences, such as the addition of various electrolytes, freezing, etc., but, as already stated, generally not against gravity.

The object of my invention is to provide a means to overcome these difficulties and to prepare emulsions in which the dispersed material is in a very fine state of sub-division and which possess very high stability against various coagulating influences, as will be explained further on.

Briefly, the invention consists in preparing a primary emulsion with the help of an emulsifying agent which will cause the emulsification of the non-aqueous phase into a very fine state of sub-division in the aqueous phase. To the so prepared primary emulsion sulphite liquor as such, or stabilizers obtained therefrom, as will be explained hereinafter, in a suitable quantity are added so as to impart to the emulsion the required stability. For the preparation of the primary emulsion any emulsifying agent which will cause a sufficiently fine dispersion of the material to be emulsified, may be used. Preferably, the primary emulsion is prepared by adding a small amount of an acid soluble in the non-aqueous phase such as oleic acid, ricin-oleic acid, sulphonic acid, or the like, to the material to be emulsified and adding the mixture to an aqueous solution of an alkaline substance such as sodium hydroxide, potassium hydroxide, sodium carbonate, sodium silicate, etc., of a suitable concentration, while more or less vigorously stirring.

The primary emulsion may be prepared by stirring the non-aqueous phase in an aqueous solution of an emulsifying agent such as soap, casein, gelatin, etc.; further, the primary emulsion may be prepared with the help of a colloid mill.

Generally, the emulsion obtained in this manner, possesses only a slight stability against various coagulating influences such as freezing, boiling, addition of electrolytes, addition of finely divided solid materials, and the like. To the primary emulsion a suitable amount of sulphite liquor is then added. It is likely that the constituents which act as a stabilizer are certain kinds of sulphonic acids, probably the so-called lignin sulphonic acid, which generally are present in the form of calcium salts in the original sulphite liquor, and which salts possess a less stabilizing action than the corresponding alkali salts. Therefore, I preferably treat the sulphite liquor so as to obtain substances which have a very strong stabilizing action on aqueous dispersions. I have found that powerful stabilizers from sulphite liquor as such or from similar materials, such as concentrated sulphite liquor, can be obtained in the following way:

To sulphite liquor which may be first diluted with water, an amount of acid such as hydrochloric acid, sulphuric acid, acetic acid, or the like, is added so as to secure a slightly acid reaction of the liquid. Thereupon an amount of substances like glue, gelatin, or other albumen is added to the acidified sulphite liquor causing the formation of a precipitate. This precipitation may be effected in one or more stages as desired, in order to obtain fractions with mutually different properties. The precipitated substances are separated from the liquid for instance by filtration, and may then be neutralized by dissolving the same in an aqueous solution of an alkaline substance such as NaOH, KOH, $NH_4OH$, or the like. To this solution a sufficient amount of acid may then be added so as to form a precipitate, and the latter treatment may be repeated. In this way a precipitate substantially free of electrolytes is obtained. The precipitate formed in any of these ways contains albumen and other materials, which most probably are certain kinds of sulphonic acids, although it is not certain just what their exact nature is, and while I may refer to these materials as sulphonic acids herein, it will be understood that I do not intend to limit myself in this regard. I have found that the substances present in the precipitate, other than the albumen, exert a powerful stabilizing action upon aqueous dispersions and impart to said dispersions a very high stability against all kinds of coagulating influences such as the addition of electrolytes, especially those containing polyvalent positive ions, freezing, storage, addition of finely divided solid materials, etc. It may be desirable to separate the albumen from the stabilizer as the presence of the albumen in the emulsion to which the stabilizer is added decreases its stability against acidic materials. This separation may be effected in any convenient manner, as for example, by dialysis, or by extracting the non-albuminous material with solvents such as alcohol, acetone, etc., which selectively dissolve the said non-albuminous material.

The segregation from the sulphite liquor of the so-termed sulphonic acid constituents in a relatively pure state and substantially free of soluble salts usually present in the sulphite liquor, affords a desirable advantage over the use of the unpurified material as a stabilizing agent, for although an emulsion made with this unpurified material may be highly stable to coagulation by electrolytes, still the presence of such electrolytes, as well as other materials usually contained in sulphite liquor, in the emulsion is objectionable where a highly-water-resistant and relatively impermeable water-free film of the emulsion is desired. The sulphonic acids segregated from the sulphite liquor are first converted into salts of alkaline metals by addition of substances like sodium hydroxide, potassium hydroxide, and the like.

The amount of sulphite liquor or of stabilizers obtained therefrom which is added to the emulsion is governed by the desired degree of stability of the final product as this stability will be greater the larger the amount of stabilizer added to the primary emulsion. In some cases difficulties are met in obtaining the desired stability by the addition of sulphite liquor or of sulphonic acids obtained therefrom. For example, when the primary emulsion contains emulsifiers of the kind of sodium oleate, sodium naphthenate or the like, these latter may hinder the stabilizing act of the first named sulphonic acids or their salts. This may be explained on the theory that the stabilizers present in the sulphite liquor or their salts are less polar than the other materials, and therefore are prevented completely or partially from going into the surface layer of the dispersed particles which, on the other hand, is necessary in order to realize the stabilizing power of the said sulphonic acids or their salts.

I have found that in these cases the required stability is only obtained when adding a large amount of say 10 to 20% of sulphite liquor to the primary emulsion. By thus increasing the concentration of the less polar substance the low polarity thereof is compensated for by the increased relative concentration and apparently results in changing the equilibrium so as thereby to bring more of the less polar substance into the surface layer. In order to avoid the foregoing difficulties, I proceed in such a way as to prevent any polar substance, which may be originally present in the material to be dispersed, from going into the surface layer. This can be accomplished by dispersing the non-aqueous phase in an aqueous solution of the sulphonic acids derived from sulphite liquor in the manner above described. Preferably, however, I use the alkali salts of these acids, while avoiding any excess of alkali, and with the help of a suitable stirring apparatus, preferably a colloid mill. The avoidance of the excess alkali and the use of a high-speed stirring apparatus similar to a colloid mill appear to be the determining factors in producing this result. In this way very stable emulsions containing only a small amount, say 1 to 3%, of the sulphonic acid derived from sulphite liquor can be prepared. With the so obtained emulsions any manipulation known in the art may be effected, thus they may be homogenized, finely divided substances such as clay may be mixed therewith for the production of a non-fluent water-free film, etc.

I claim as my invention:

1. The method which comprises treating sulphite liquor with an albuminous substance to form a precipitate containing sulphonic acids, dissolving said precipitate in alkali, adding acid to the solution to form a second precipitate containing sulphonic acids substantially free of electrolytes, and separating sulphonic acids from the last named precipitate.

2. Method in accordance with claim 1, in which the sulphonic acids are separated from the precipitate by dialysis.

3. Method in accordance with claim 1, in which the sulphonic acid is separated from the precipitate by extracting with a selective solvent for the sulphonic acid.

4. The process of recovering an emulsion stabilizing agent from sulphite liquor which comprises rendering the liquor acid, treating the acid liquor with an albuminous substance whereby a precipitate is formed, separating said precipitate and dissolving it in an alkaline solution, acidifying said solution to cause reprecipitation and separating sulphonic acid from said last named precipitate.

HYMAN LIMBURG.